INVENTOR
L. CARON
BY Donald M. Duft
ATTORNEY

April 22, 1969 L. CARON 3,440,493

ERROR DETECTION CIRCUIT

Filed Feb. 15, 1966

Sheet 2 of 2

United States Patent Office 3,440,493

Patented Apr. 22, 1969

3,440,493
ERROR DETECTION CIRCUIT
Lionel Caron, Matawan, N.J., assignor to Bell Telephone Laboratories, Incorporated, New York, N.Y., a corporation of New York
Filed Feb. 15, 1966, Ser. No. 527,557
Int. Cl. H01h 47/32
U.S. Cl. 317—148.5 8 Claims

ABSTRACT OF THE DISCLOSURE

A checking circuit is disclosed for indicating when signals are concurrently applied to either less than or more than a predetermined number of input conductors.

Figure 1A:
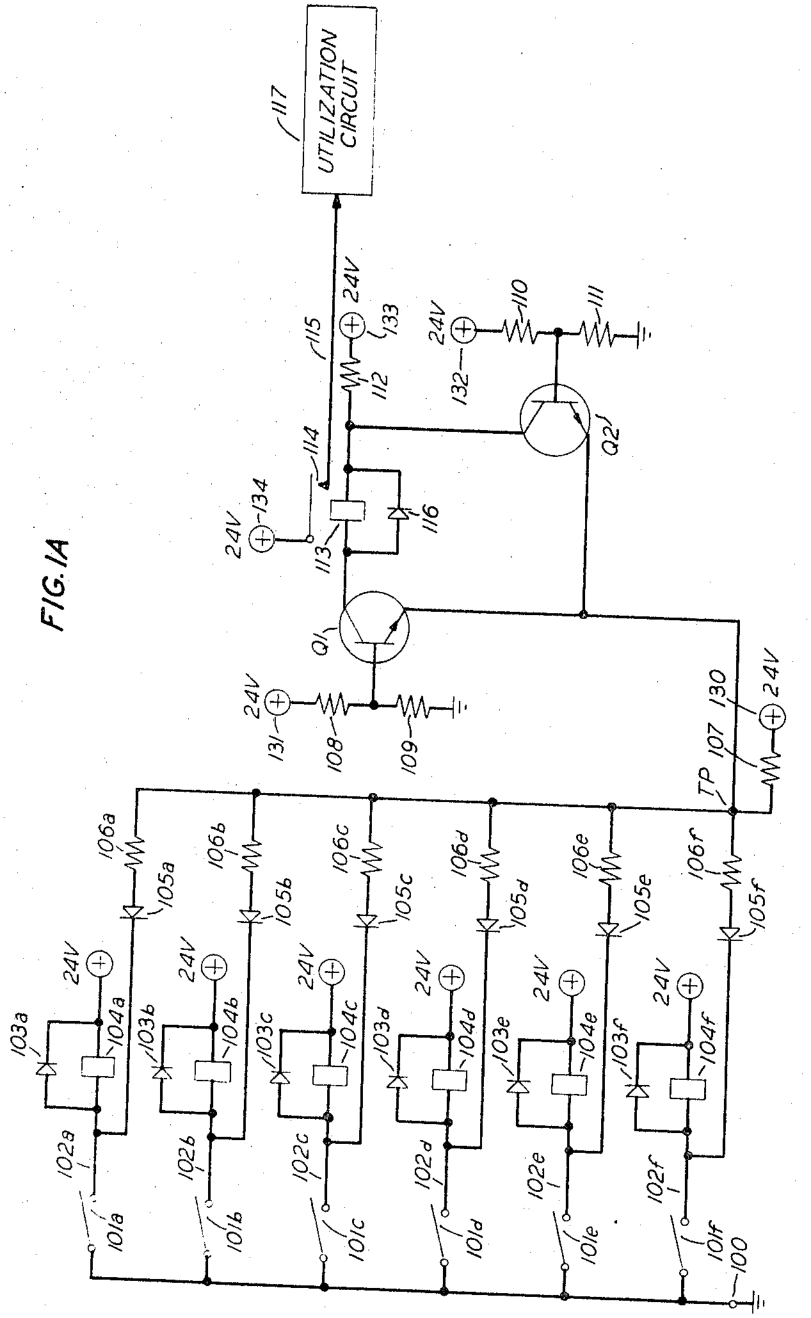

A first normally off transistor turns on when signals are concurrently applied to at least the predetermined number of conductors. The turn of this transistor operates an output relay.

A second normally off transistor turns on and inhibits the operation of the relay when signals are applied to more than the predetermined number of conductors.

This invention relates to an error detector and, in particular, to a circuit for determining the plausibility of combinational coded data.

Data receivers in systems in which information is transmitted in combinational code form are normally equipped with error detectors which determine the plausibility of each received data word before the receiver is permitted to respond to and perform the tasks represented by the word. In electromechanical switching systems, combinational coded information is transmitted to data receivers by causing energizing potentials to be applied selectively and concurrently to a plurality of the receiving circuit's input conductors. Each input conductor, in turn, is connected to an individual relay which operates whenever its conductor is energized. The received data is checked for coding errors by symmetric circuits formed from contacts of the input relays.

Some of the current electronic type switching systems utilize relays in limited numbers in their data receiving circuits. However, since the size, power consumption, and heat dissipation of each component in an electronic system must be held to a minimum, the relays utilized are of the miniature type and are equipped with far fewer contacts than are their counterparts in electromechanical systems. This limited contact availability precludes the use of symmetric circuits formed from the contacts of these relays for error checking purposes.

It may be seen from the foregoing that the error checking arrangements utilized in electromechanical systems are not suitable for use in electronic systems.

It is therefore an object of the invention to provide an approved error detector.

A further object is to provide an improved error detector for checking the plausibility of combinational coded data.

A further object is to provide an improved error detector for use with electronic type systems.

A still further object is to provide an error detector suitable for use with electronic type systems in which relays of limited size, power consumption, and contact capability are utilized.

In accordance with the disclosed illustrative embodiment of the invention, a transistorized error detector is provided and is shown as comprising a portion of a data receiver having a plurality of input conductors each of which is individual to a relay which operates whenever a signal is applied to its conductor. My error detector checks the coding of each data word received by the input conductors and operates an output relay to provide a check signal only in the event that a received data word is of the proper combinational code form. My circuit utilizes a resistive network which is connected over separate paths to each input conductor in such a manner that the potential of a point within the network is dependent upon the number of input conductors currently energized. This potential is applied to transistor circuitry which generates a check signal only if the proper number of input conductors are energized during the reception of a data word.

In the disclosed embodiment it is assumed that input data is received in a 2-out-of-6 combinational code form. Six input relays are shown, and each operates whenever a ground is applied to its associated input conductor. The resistive network is connected at one end to a positive source of reference potential and is connected over separate paths to each input conductor. The potential of a selected network point, hereinafter referred to as a test point, is essentially that of the reference potential during the idle condition of the circuit where no input conductors are grounded. The grounding of two input conductors for the reception of a valid data word lowers the potential of the test point below that of the reference potential a predetermined amount. The grounding of only a single input conductor, or the grounding of more than two input conductors, for the reception of an improperly encoded data word, alters the potential of the test point either less or more, respectively, than that for the reception of good information. The potential developed at the test point during the reception of a data word is utilized to control the generation of an output indication signifying whether the coding of the data is good or bad.

A first normally off transistor is connected to the test point. This transistor is biased in such a manner that it turns on and attempts to operate a check relay whenever the potential at the test point equals that which results from the application of grounds to at least two of the input conductors. A second normally off transistor is also connected to the test point. This transistor is biased off by a different amount, and it turns on and conducts whenever the potential of the test point drops by the amount resulting from the application of grounds to three or more input conductors coincidentally. The output of the second transistor is interconnected with the first transistor and the check relay in such a manner that the turn-on of the second transistor inhibits the operation of the check relay even though the first transistor is on.

With the foregoing arrangement, neither transistor turns on and the check relay does not operate in the event that less than two input conductors are grounded during the reception of a data word. The grounding of two input conductors turns only on the first transistor which, in turn, operates the check relay to signify the reception of good data. The grounding of three or more input conductors turns on both transistors, with the turn-on of the second transistor inhibiting the operation of the check relay.

A feature of the invention is the provision of a check circuit having a first normally off transistor biased so that it turns on only when input signals are concurrently applied to at least a predetermined number of input conductors, and a second normally off transistor biased so that it turns on only when input signals are concurrently applied to more than said predetermined number of input conductors.

A further feature is the provision in the check circuit of a relay which operates to generate a data check signal upon the turn-on of the first transistor and which is inhibited in its operation upon the turn-on of the second transistor.

A further feature is the provision in the check circuit of a network connected to the input conductors for supplying to the transistors a potential whose magnitude varies in accordance with the number of input conductors concurrently energized.

A still further feature is the provision of a plausibility check circuit having a first transistor interconnected with signal receiving paths whereby its conductive state is altered upon the concurrent application of signals to at least a predetermined number of said paths, an output relay operable in response to the alteration of the conductive state of the first transistor, and a second transistor interconnected with the input paths whereby its conductive state is altered only when more than a predetermined number of paths are concurrently energized with the alteration in the conductive state of the second transistor being effective for inhibiting the operation of the relay.

Figure 1B:
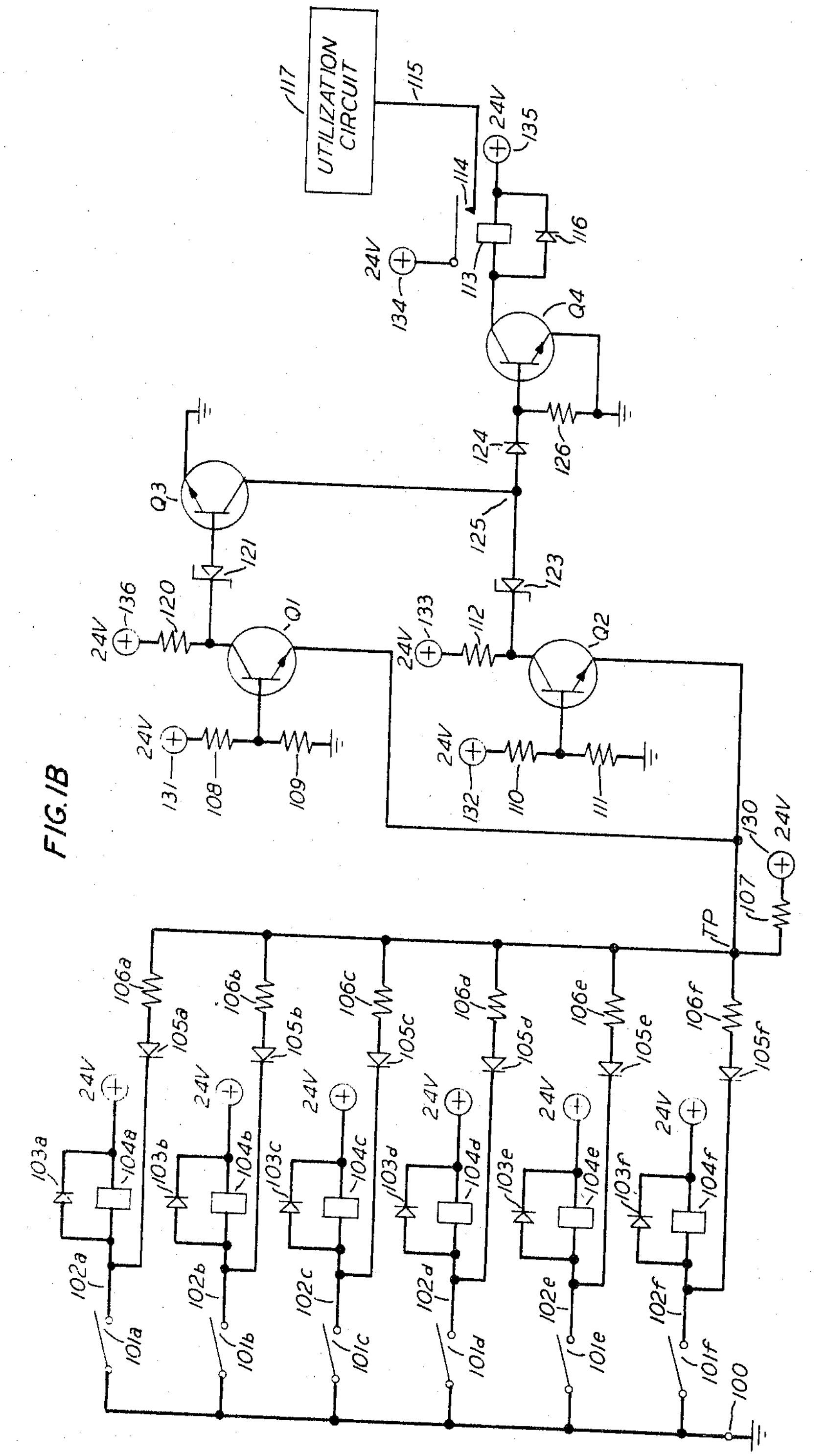

These other objects and features of the invention will become apparent from the reading of the following description taken in conjunction with the drawings, in which FIG. 1A represents a first exemplary embodiment of the invention and FIG. 1B illustrates a second illustrative embodiment.

FIG. 1A discloses the input circuit of a typical data receiver, together with the circuitry provided in accordance with our invention to check the plausibility of the received data. Shown on this figure are a plurality of input relays 104*a* through 104*f* and a plurality of input conductors 102*a* through 102*f*, each of which is individual to one of the input relays. Also shown are a plurality of switches 101*a* through 101*f*, each of which is individual to one of the input conductors and is effective when operated to apply an energizing ground over its associated intput conductor to operate the input relay connected thereto. The switches 101 are symbolic representations of the equipment that would be provided in an electronic type system to respond to microsecond type pulses and, in response thereto, to apply the necessary ground potentials to conductors 102– to operate relays 104–.

The network which generates a potential indicative of the number of input conductors grounded comprises the 24-volt potential +130, resistor 107, terminal TP, resistors 106*a* through 106*f*, and diodes 105*a* through 105*f*. Resistor 107 is connected from the 24-volt potential 130 to test point terminal TP. This terminal is, in turn, connected by means of separate paths to each of input conductors 102–. For example, the path connecting terminal TP ith input conductor 102*a* comprises resistor 106*a* and diode 105*a*.

The potential at terminal TP is 24 volts when none of the input conductors is grounded. The grounding of two input conductors for the reception of plausible data lowers the potential of the terminal a predetermined amount, such as for example, 10 volts, so that the resultant potential is 14 volts. The grounding of only one input conductor, which would signify implausible data, would lower the potential of the terminal a lesser amount, such as for example, 5 volts, so that the resultant potential would be 19 volts. Similarly, the grounding of three input conductors, which would also represent implausible data, would lower the potential of the terminal a greater amount, such as for example, 15 volts, so that the resultant potential would be 9 volts. The grounding of an additional number of conductors would cause a corresponding increased drop in the potential of the terminal. Thus, it may be seen that the potential developed at terminal TP provides a ready means of ascertaining the number of input conductors 102– that are concurrently grounded.

The circuit comprising transistors Q1 and Q2, together with relay 113, responds to the voltage changes at terminal TP and provides a data check signal over conductor 115 to utilization circuit 117 whenever the received information is in the proper combinational code form. Transistors Q1 and Q2 are normally biased off and each can turn on and conduct only when its emitter becomes negative with respect to its base. Resistors 108 and 109 bias the base emitter junction of transistor Q1 so that the transistor cannot conduct until the potential at terminal TP lowers by the amount resulting from the application of grounds to at least two input conductors 102– concurrently. The application of at least two grounds to these conductors lowers the potential of terminal TP sufficiently so that the emitter of transistor Q1 is negative with respect to its base. This turns its base emitter junction on, and collector current for the transistor then attempts to flow through the winding of relay 113 and resistors 112 to the positive 24-volt battery 133. Transistor Q2 is normally off, and thus its collector and the right winding terminal of relay 113 remain at essentially the 24-volt potential. With this arrangement, the turn-on of transistor Q1 while transistor Q2 remains off permits sufficient collector current in transistor Q1 to flow to operate relay 113, whose contacts 114 then close to send a data check signal to circuit 117.

The base emitter junction of transistor Q2 is reverse-biased by resistors 110 and 111 and source 132 so that the transistor remains off and does not turn on until the voltage at terminal TP falls by that amount produced by the application of grounds to three or more conductors 102– concurrently. In the event that data is received in the form of grounds to three or more conductors, transistor Q1 turns on as already described, and, additionally, transistor Q2 becomes forward-biased at its base emitter junction and turns on. The turn-on of this transistor produces a voltage drop across resistor 112 which lowers the potential of the right-hand terminal of the winding of relay 113 so that insufficient collector current can flow through transistor Q1 to operate relay 113. With relay 113 released, contacts 114 do not close and circuit 117 does not receive the data check signal.

It may be seen from the foregoing that relay 113 operates to generate a data check signal only when transistor Q1 turns on while transistor Q2 remains off. This condition is met when two, and only two, of the input conductors are concurrently grounded. The grounding of less than two of the input conductors does not lower the potential of terminal TP by the amount required to turn on either transistor. The grounding of three or more input conductors lowers the potential of terminal TP sufficiently so that both transistors turn on. The turn-on of transistor Q2 inhibits relay 113 from operating even through transistor Q1 is on.

Another embodiment of the invention is disclosed in FIG. 1B. This embodiment permits the use of a less sensitive relay than is required for the use with the circuit of FIG. 1A. The circuit of FIG. 1A is similar in many respects to that of FIG. 1B, and all elements of FIG. 1B corresponding to an element of FIG. 1A are identically designated.

Transistors Q1 and Q2 are biased by the resistors in their base circuits in the same manner as that described in connection with FIG. 1A. Namely, both are normally off; transistor Q1 turns on only when at least two of the input conductors are concurrently grounded, while transistor Q2 turns on only when at least three of the input conductors are normally grounded. Zener diode 121 interconnects the base of transistor Q3 with the collector of transistor Q1. The collector of Q1 is at a relatively high positive potential during the off condition of its transistor and, during this condition, the base emitter drive to transistor Q3 is provided by source 136, resistor 120 and Zener diode 121 to maintain the transistor on. The collector circuit for transistor Q3 is completed through Zener diode 123 and resistor 112 to the positive 24-volt potential 133. The collector current for transistor Q3 produces a voltage drop across resistor 112 which, combined with the drop across Zener diode 123, maintains the potential of terminal 125 sufficiently low so that insufficient base drive is applied to the transistor Q4 to turn it on.

The application of grounds to two of the input conductors concurrently turns on transistor Q1 as already described. The turn-on of this transistor lowers the potential of its collector, removes the drive for transistor Q3 and turns it off. The turn-off of this transistor reduces the voltage drop across resistor 112 so that the potential of terminal 125 raises sufficiently to provide enough base drive for transistor Q4 to turn it on. The turn-on of this transistor operates relay 113 which closes its contacts 114 to provide a data check signal to utilization circuit 117.

The application of grounds to at least three of the input conductors concurrently turns on both transistors Q1 and Q2. The turn-on of transistor Q1 turns off transistor Q3, as before. However, the collector current through transistor Q2 as a consequence of its turn-on, produces a voltage drop across resistor 112 of sufficient magnitude so that the resulting low potential on terminal 125 is insufficient to provide the base drive required to turn on Q4. This prevents relay 113 from operating and generating a data check signal.

It is to be understood that the above-described arrangements are but illustrative of the application of the principles of the invention. Numerous other arrangements may be devised by those skilled in the art without departing from the spirit and scope of the invention. For example, although the invention has been described for use with a combinational code error detector of the 2-out-of-6-type, it may be appreciated that the same principles may be applied to use with other combinational codes, such as for example, 1-out-of-10, 2-out-of-5, 3-out-of-9, etc.

I claim:

1. In a checking circuit, a plurality of signal receiving paths, a test terminal having a potential that is dependent upon the number of said paths to which signals are concurrently applied, a first normally off transistor, means including conductor means connected between said terminal and the emitter of said first transistor for turning on said first transistor upon the concurrent application of signals to at least a predetermined number of said paths, output means operable to indicate the concurrent application of signals to only said predetermined number of said paths, means responsive to the turn-on of said first transistor for operating said output means, a second normally off transistor, means including conductor means connected between said terminal and the emitter of said second transistor for turning on said second transistor upon the concurrent application of signals to more than said predetermined number of said paths, and means responsive to the turn-on of said second transistor for inhibiting the operation of said output means.

2. The invention of claim 1, in which said checking circuit further comprises, a resistor connecting said terminal with a source of reference potential, a plurality of resistors each of which interconnects said test terminal with an individual one of said paths, said resistors and said potential being effective to vary the voltage at said test terminal in accordance with the number of paths concurrently receiving signals.

3. The invention of claim 2 in which said means for turning on said transistors comprises, means for reverse-biasing the base emitter junction of said first transistor by a first amount, means for reverse-biasing the base emitter junction of said second transistor by a greater amount, said biasing means and said interconnections being effective to forward-bias the base emitter junction of said first transistor when signals are concurrently applied to at least a predetermined number of paths and further being effective for forward-biasing the base emitter junction of both transistors when signals are concurrently applied to more than said predetermined number of said paths.

4. The invention of claim 3 in combination with a resistor interconnecting the collector of said second transistor with a source of potential, a relay having a winding connected between the collectors of said transistors, said connections being effective to operate said relay when the base emitter junction of said first transistor is forward-biased and further being effective to inhibit the operation of said relay when the base emitter junctions of both transistors are concurrently forward-biased, and contacts effective upon the operation of said relay for generating a data check signal.

5. The invention of claim 3 in combination with a third transistor, means connecting the base of said third transistor to the collector of said first transistor so that said third transistor is turned on when said first transistor is off and so that said third transistor is off when said first transistor turns on, means connecting the collector of said third transistor to the collector of said second transistor, a fourth transistor, means connecting the base of said fourth transistor to the collector of said third transistor, a relay having a winding connected between a source of potential and the collector of said fourth transistor, said connections being effective to turn on said fourth transistor to operate said relay upon the turn-off of said third transistor, and means effective upon the turn-on of said second transistor to inhibit the turn-on of said fourth transistor, and contacts effective upon the operation of said relay to generate a data check signal.

6. In combination, a plurality of input conductors for receiving signals, a test terminal, means interconnecting said terminal with said input conductors for varying the potential of said terminal in accordance with the number of said conductors to which input signals are concurrently applied, a first and a second transistor, means effective for biasing said transistors to an off condition when input signals are concurrently applied to less than a predetermined number of said conductors, means interconnecting said first transistor with said test terminal for turning on said first transistor when input signals are concurrently applied to at least a predetermined number of said conductors, means interconnecting said second transistor with said test terminal for turning on said second transistor when signals are concurrently applied to more than said predetermined number of input conductors, a third transistor, means connected to said third transistor for maintaining it in an on state when said first transistor is off and for turning off said third transistor when said first transistor turns on, a fourth transistor, means connected to said fourth transistor for turning it on when said third transistor turns off, said last-named means being further effective for inhibiting the turn-on of said fourth transistor whenever said second transistor turns on, a relay operated by the turn-on of said fourth transistor, and contacts of said relay effective upon its operation to provide a data check signal.

7. In combination, a plurality of signal receiving paths, a test terminal having a potential that is dependent upon the number of said paths to which signals are concurrently applied, a first transistor, means including conductor means connected between said terminal and the emitter of said first transistor for altering the conductive state of said first transistor upon the concurrent application of signals to at least a predetermined number of said paths, output means operable in response to the alteration of the conductive state of said first transistor to indicate the concurrent application of signals to only said predetermined number of said paths, a second transistor, means including conductor means connected between said terminal and the emitter of said second transistor for altering the conductive state of said second transistor upon the concurrent application of signals to more than said predetermined number of said paths, and means responsive to the alteration of the conductive state of said second transistor for inhibiting the operation of said output means.

8. In combination, a plurality of input conductors for receiving signals, a test terminal, means interconnecting said terminal with said input conductors for varying the potential of said terminal in accordance with the number of said conductors to which input signals are concurrently applied, a first and a second transistor, means effective for biasing said transistors to an off condition when input signals are concurrently applied to less than a predetermined number of said conductors, conductor means interconnecting the emitter of said first transistor with said test terminal for turning on said first transistor when input signals are concurrently applied to at least a predetermined number of said conductors, conductor means interconnecting the emitter of said second transistor with said test terminal for turning on said second transistor when signals are concurrently applied to more than said predetermined number of input conductors, a relay having a winding connected in series between the collector of said first and second transistors, said relay being operable in response to the turn-on of said first transistor, means effective upon the turn-on of said second transistor for inhibiting the operation of said relay, and contacts of said relay effective upon its operation to provide a data check signal.

References Cited

UNITED STATES PATENTS

| | | | |
|---|---|---|---|
| 2,484,226 | 10/1949 | Holden | 340—146.1 |
| 2,921,191 | 1/1960 | Kennedy | 328—147 |
| 2,926,334 | 2/1960 | Abbott | 340—146.1 |
| 3,099,720 | 7/1963 | Gotthardt | 179—175.2 |
| 3,159,772 | 12/1964 | Van Doorn | 317—148.5 |
| 3,160,852 | 12/1964 | Simms | 340—146.1 |
| 3,270,212 | 8/1966 | Daigle et al. | 328—148 X |
| 3,307,082 | 2/1967 | Riedmayr | 317—148.5 |
| 3,317,753 | 5/1967 | Mayhew. | |
| 3,341,748 | 9/1967 | Kammiller | 317—148.5 |

OTHER REFERENCES

Trampel, "Checking Circuit," IBM Technical Disclosure Bulletin, vol. 3, No. 12, May 1961, pp. 24, 25.

LEE T. HIX, *Primary Examiner.*

U.S. Cl. X.R.

307—254, 211; 328—99